US 9,652,289 B2

(12) United States Patent
Dixit et al.

(10) Patent No.: US 9,652,289 B2
(45) Date of Patent: May 16, 2017

(54) SYSTEMS AND METHODS FOR S-LIST PARTITIONING

(75) Inventors: Amol Dilip Dixit, Bellevue, WA (US); Bradley Michael Waters, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/458,355

(22) Filed: Apr. 27, 2012

(65) Prior Publication Data

US 2013/0290667 A1 Oct. 31, 2013

(51) Int. Cl.
*G06F 12/00* (2006.01)
*G06F 13/00* (2006.01)
(Continued)

(52) U.S. Cl.
CPC ........ *G06F 9/5016* (2013.01); *G06F 12/0223* (2013.01); *G06F 12/0806* (2013.01); *G06F 12/02* (2013.01)

(58) Field of Classification Search
CPC ...... G06F 12/00; G06F 12/02; G06F 12/0223; G06F 12/0871; G06F 17/30961; G06F 9/5016; G06F 12/0806
(Continued)

(56) References Cited

U.S. PATENT DOCUMENTS 6,986,015 B2 1/2006 Testardi
7,844,973 B1 11/2010 Dice
(Continued)

FOREIGN PATENT DOCUMENTS

RU 2390824 C2 5/2010
RU 2406127 C2 12/2010
(Continued)

OTHER PUBLICATIONS

Richard L. Hudson, et al., McRT-Mallock: a scalable transactional memory allocator, Jun. 10-11, 2006, ACM, ISMM'06, pp. 74-83.*
(Continued)

*Primary Examiner* — Mark Giardino, Jr.
*Assistant Examiner* — Shane Woolwine
(74) *Attorney, Agent, or Firm* — Stephen T. Olson; Harness, Dickey & Pierce, P.L.C.

(57) ABSTRACT

Systems and techniques of the management of the allocation of a plurality of memory elements stored within a plurality of lockless list structures are presented. These lockless list structures (such as Slists) may be made accessible within an operating system environment of a multicore processor—and may be partitioned within the system. Memory elements may also be partitioned among these lockless list structures. When a core processor (or other processing element) makes a request for allocating a memory element to itself, the system and/or method may search among the lockless list structures for an available memory element. When a suitable and/or available memory element is found, the system may allocate the available memory element to requesting core processor. Dynamically balancing of memory elements may occur according to a suitable balancing metric, such as maintain substantial numerical equality of memory elements or avoid over-allocation of resources.

20 Claims, 3 Drawing Sheets

(51) Int. Cl.
*G06F 13/28* (2006.01)
*G06F 9/50* (2006.01)
*G06F 12/02* (2006.01)
*G06F 12/0806* (2016.01)

(58) Field of Classification Search
USPC ... 711/3, 113, 117, 130, 150–153, 170, 173; 707/790–812
See application file for complete search history.

(56) References Cited

U.S. PATENT DOCUMENTS

| | | | | |
|---|---|---|---|---|
| 7,904,688 | B1* | 3/2011 | Kuo et al. | 711/170 |
| 8,495,641 | B2* | 7/2013 | McKenney | 718/103 |
| 2003/0121030 | A1 | 6/2003 | Koob et al. | |
| 2004/0088702 | A1 | 5/2004 | Garthwaite | |
| 2004/0205304 | A1* | 10/2004 | McKenney et al. | 711/148 |
| 2005/0188164 | A1 | 8/2005 | Ballantyne et al. | |
| 2008/0229044 | A1* | 9/2008 | Krig | G06F 13/385 711/169 |
| 2009/0259780 | A1 | 10/2009 | Hsu | |
| 2009/0259870 | A1 | 10/2009 | Sharma et al. | |
| 2010/0223432 | A1* | 9/2010 | Eidus et al. | 711/148 |
| 2010/0251250 | A1* | 9/2010 | Kishan et al. | 718/103 |
| 2011/0296437 | A1* | 12/2011 | Raut et al. | 719/314 |

FOREIGN PATENT DOCUMENTS

| | | |
|---|---|---|
| TW | 200424867 A | 11/2004 |
| TW | 201112125 A | 4/2011 |
| WO | 2013/163008 A1 | 10/2013 |

OTHER PUBLICATIONS

"Scalable Lock-Free Dynamic Memory Allocation"—Published Date: Jun. 9, 2004 Proceedings: Proceedings of the ACM SIGPLAN 2004 conference on Programming language design and implementation Author: Maged M. Michael; pp. 35-46 http://www.research.ibm.com/people/m/michael/pldi-2004.pdf.

"Making Lockless Synchronization Fast: Performance Implications of Memory Reclamation"—Published Date: Apr. 25, 2006 Proceedings: Parallel and Distributed Processing Symposium, 2006 Author: Thomas E. Hart, Paul E. McKenney, Angela Demke Brown pp. 10; http://www.rdrop.com/users/paulmck/RCU/hart_ipdps06.pdf.

"Lockless Programming Considerations for Xbox 360 and Microsoft Windows"—Retrieved Date: Jun. 30, 2011 Proceedings: NA Author: Bruce Dawson Pages: NA http://msdn.microsoft.com/en-us/library/windows/desktop/ee418650(v=vs.85).aspx.

A Lock-Free Multiprocessor OS Kernel—Published Date: Jun. 19, 1991 Proceedings: NA Author: Henry Massalin , Calton Pu; Pages: NA http://citeseemist.psu.edu/viewdoc/download.jsessionid=03920B2BCC2E76FFD9881461F7F111E3?doi=10.1.1.39.8065&rep=rep1&type=pdf.

"International Search Report & Written Opinion Received for counterpart PCT Application No. PCT/US2013/037266", Mailed Date: Aug. 23, 2013, 14 Pages.

Sheth, et al., "Data Structure Distribution and Multi-Threading of Linux File System for Multiprocessors", In Proceedings of the Fifth International Conference on High Performance Computing, Dec. 17, 1998, 8 Pages.

Berger, et al., "Hoard: A Scalable Memory Allocator for Multithreaded Applications", In Proceedings of the Ninth International Conference on Architectural Support for Programming Languages and Operating Systems, Nov. 12, 2000, 12 Pages.

Wentzlaff, et al.,"Factored Operating Systems (fos): The Case for a Scalable Operating System for Multicores", In Proceedings of ACM SIGOPS Operating Systems Review, vol. 43, Issue 2, Apr. 21, 2009, 10 Pages.

"Hash Table", Retrieved at <<https://en.wikipedia.org/wiki/Hash_table>>, Published on: Apr. 23, 2012, 16 Pages.

Sanders, Beverly A., "The Shared Map Pattern", In Proceedings of the Workshop on Parallel Programming Patterns, Mar. 30, 2010, 13 Pages.

Michael, Maged M., "High Performance Dynamic Lock-Free Hash Tables and List-Based Sets", In Proceedings of the 14th Annual ACM Symposium on Parallel Algorithms and Architectures, Aug. 10, 2002, 10 Pages.

"Office Action Issued in counterpart European Patent Application No. 13720655.3", Mailed Date: Oct. 15, 2015, 3 Pages.

Response to Office Action mailed Oct. 15, 2015 in counterpart European Patent Application No. 13720655.3, Response Dated Feb. 18, 2016, 13 Pages.

"Office Action and Search Report Issued in Taiwan Patent Application No. 102113317", Mailed Date: Jan. 18, 2017, 13 Pages.

\* cited by examiner

SYSTEMS AND METHODS FOR S-LIST PARTITIONING

BACKGROUND

Slists are data structures that are lockless implementations of a LIFO (last in first out) list made available in operating systems. Slists are typically a desired choice of data structure to hold fixed size buffers that can be allocated and released without holding any spinlocks or other synchronization primitives. Slists may also be used for variable sized contents in the form of a lockless singly linked list. Other capabilities are provided in an operating system environment—such as lookaside lists which are built on Slists.

However, in some scenarios, the use of Slists may not be desirable. For one example, a single Slist header may become a cache line contention hotspot on servers with many processors accessing the same Slist. This may be a scalability bottleneck in both native and Hyper-V virtualized scenarios.

In another scenario, Slists are mainly used as packet caches or fixed size buffer repositories. However there are scenarios where more complex data structures or resources of possibly varying sizes have to be maintained in such a lockless list. It may be desired to have more operations than just 'Push' and 'Pop' for purposes such as load balancing, packet stealing, NUMA awareness and such other algorithmic requirements. These are often satisfied by another data structure abstraction to manage multiple Slists. Lookaside lists are one such example.

Lookaside lists maintain a cache of fixed size buffers for speedy memory allocation and release. For processor affinity benefits, some operating systems also provide per-processor lookaside lists. These per-processor lookaside lists are generally (but not necessarily) backed by a global list to contain backup packets in case the per-processor list is empty. It may be desired to have extra resource allocations to have a fairly big global backup list to provide an abstraction of a single resource pool. When demand recedes, these extra memory allocations may be freed if there is demand for the memory. However, in certain scenarios resources cannot be over-allocated. This is particularly true for hardware drivers that define limits of their capacity—like maximum number of I/O requests a RAID controller can process. Advance algorithms tie these limits to Slist depths and avoid using spinlocks. Also extra overhead of allocs and frees cause memory fragmentation and costs CPU cycles. Lookaside lists that allocate more than the requisite quantity may not be used for these reasons.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

In one embodiment, systems and methods for managing the allocation of a plurality of memory elements stored within a plurality of lockless list structures are presented. These lockless list structures (such as Slists) may be made accessible within an operating system environment of a multicore processor. In some embodiments, the lockless list structures, Slists or the like may be embedded in other common data structures like hashes, trees, etc. to meet the different resource allocation and management requirements.

Some embodiments may partition this plurality of lockless list structures and initially partition the memory elements among these lockless list structures. When a core processor (or other processing element) makes a request for allocating a memory element to itself, the system and/or method may search among the lockless list structures for an available memory element. When a suitable and/or available memory element is found, the system may allocate the available memory element to requesting core processor.

In some embodiments, the system and/or method may then dynamically balance the set of memory elements among the various lockless list structures according to a suitable balancing metric. Such a possible metric might be to simply maintain substantial numerical equality of memory elements among the lockless list structures. Other metrics might include other load-balancing considerations—possibly based on the type of process running, possible contention situations or the like—e.g., such as mentioned above as to reduce CPU contention or avoiding over-allocation of memory resources.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
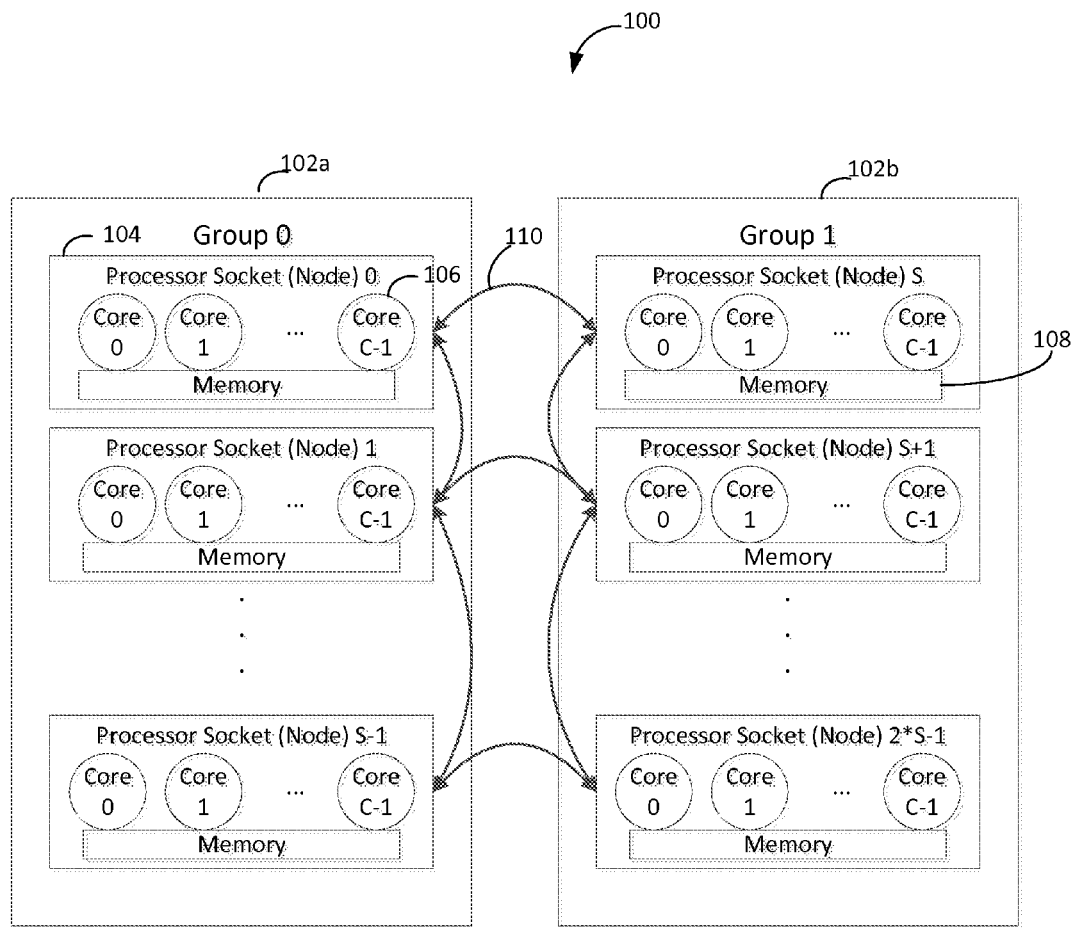
FIG. 1 illustrates an exemplary computer system in which the systems and techniques of the present application may be hosted and operating.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

In order to meet the potential bottleneck of resources, the present application discloses a number of embodiments that allow for effective and efficient use of Slists. In one embodiment, Slists may be partitioned in an effective manner which addresses many aforementioned limitations while still maintaining the lockless nature of resource Slists, reducing cacheline contention, fixed quantity allocation and resource sharing/stealing between the lists. In other embodiments, these techniques may utilize processor affinity and NUMA awareness for optimal performance.

FIG. 1 depicts a computer system diagram showing a multiple group, NUMA node (i.e., processor socket), multi-core system 100. System 100, as shown, comprises 2 groups—e.g., Group 0 (102a) and Group 1 (102b). In one embodiment, each group may comprise up to 64 (e.g. labeled 0 to 63) Logical Processors (LPs).

It will be appreciated that a suitable system may have 1 group if there are fewer than 64 logical processors. Similarly, a system may have more than 2 groups. NUMA nodes are fully contained in a group so it may be possible that a group may have fewer than 64 logical processors. A system may have several (more than 2 groups) depending on the number of logical processors contained in the system.

As is shown, each group may further comprise nodes 104 (i.e. processor sockets). Nodes in the diagram may also refer to NUMA (Non Uniform Memory Access) Nodes. In many current systems, NUMA nodes are Numbered 0 to 63 across the entire system spanning all groups; however, future systems may have a different number of nodes and the present application is not limited to such current specifications. Each such node may further comprise cores 106. In this embodiment, each LP may be a core or a hardware thread. Logical Processors are uniquely numbered 0 to 63 within each group.

In some computing environment, systems with more than one physical processor—or systems with physical processors that have multiple cores—can provide the operating system with multiple logical processors. A Logical Processor is one logical computing engine from the perspective of the operating system, application or driver. A "core" (or "core processor") is one processor unit, which can consist of one or more logical processors. A physical processor may consist of one or more cores. A physical processor may be construed the same as a processor package, a socket, or a CPU.

In addition, Cores 0 through C-1 may share a memory resource 108. Local memory access time between cores and memory on a given node may be faster than memory access time to other nodes. Connections 110 between nodes may be such that all nodes may access memory in all other nodes but memory access time may be slower than access local memory.

It should be appreciated that all nodes may not be necessarily fully connected and, further, that memory access from one node to another may need to traverse an additional node to access memory on a 3rd node.

Slist Management

Figure 2A:
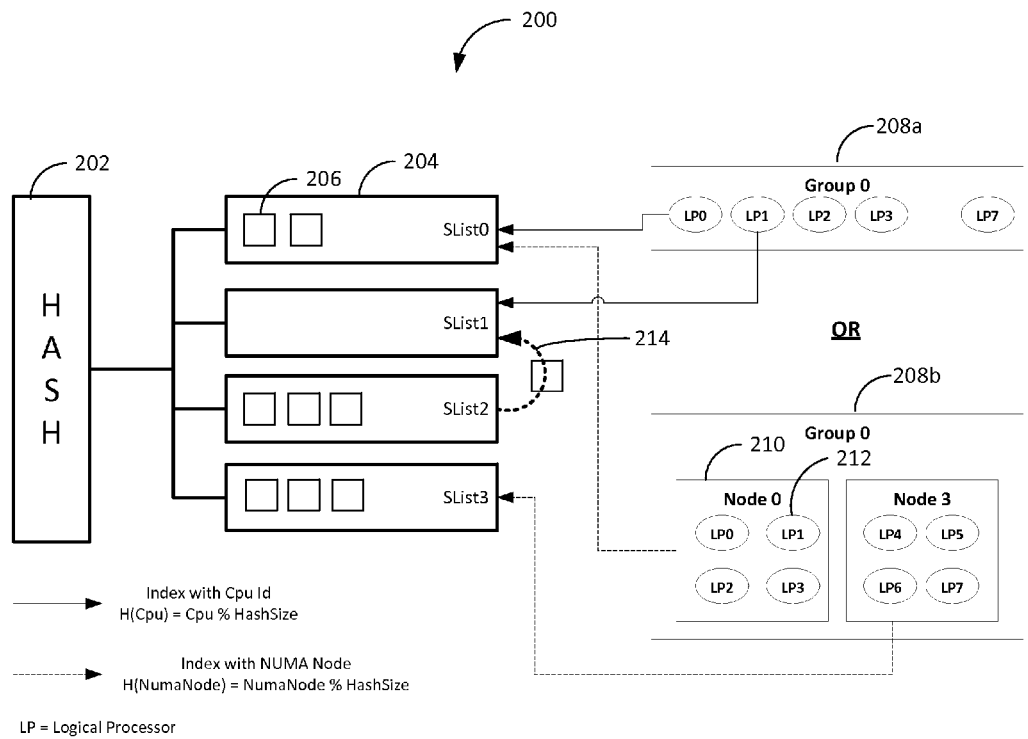
FIG. 2A is one embodiment of an adaptive hash structure system and method for the management of Slists.
Figure 2B:
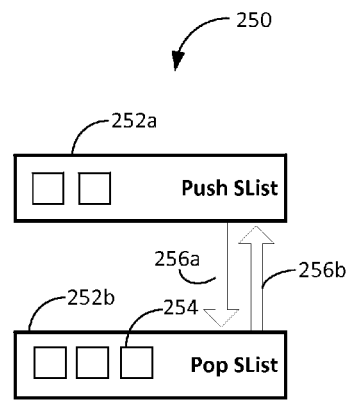
FIG. 2B is an embodiment of a dynamic list swapping system and method for the management of Slists.

The present application discloses many embodiments for the effective management of lockless list structures, Slists or the like. FIGS. 2A and 2B depicts two such embodiments—an adaptive hash function (FIG. 2A) and a dynamic Pop and Push structure (FIG. 2B) for Slist management. In these embodiments, it may be desirable to provide resource or packet management in lockless lists (like Slists) in order to:
  i) reduce CPU cache line contention;
  ii) avoid over-allocation of resources;
  iii) provide for resource sharing and stealing between the lists to adapt to resource demands with a maximum limit;
  iv) provide additional logic for NUMA topology awareness, processor affinity etc.; and/or
  v) provide specific memory allocation requirements like allocators, e.g., within 4 GB bounds and such other restrictions. No additional allocs and release of memory may be desired which may result in fragmentation which may be an issue—e.g., especially with 4 GB limits.

In general, the techniques and embodiments of this present application tend to embed lockless list structures, Slists or the like in other common data structures like hashes, trees, etc. to meet the different resource allocation and management requirements.

In many of the present embodiments, systems and methods for managing the allocation of a plurality of memory elements stored within a plurality of lockless list structures are presented. These lockless list structures (such as Slists) may be made accessible within an operating system environment of a multicore processor.

These embodiments may partition this plurality of lockless list structures and initially partition the memory elements among these lockless list structures. When a core processor (or other processing element) makes a request for allocating a memory element to itself, the system and/or method may search among the lockless list structures for an available memory element. When a suitable and/or available memory element is found, the system may allocate the available memory element to requesting core processor. Such partitioning of lockless list structures may tend to reduce CPU contention.

The system and/or method may then dynamically balance the set of memory elements among the various lockless list structures according to a suitable balancing metric. Such a possible metric might be to simply maintain substantial numerical equality of memory elements among the lockless list structures. Other metrics might include other load-balancing considerations—possibly based on the type of process running, possible contention situations or the like—e.g., such as mentioned above as avoiding over-allocation of memory resources.

In another embodiment, a suitable allocation module may be implemented within the computer system (such as the one shown in FIG. 1—or in any other suitable multicore processing system). For merely one example, an allocation module may be executing on one of the core processors and implementing the dynamic memory allocation from there. As will be discussed in greater detail below, the allocation module may manage the dynamic partitioning of memory elements in a variety of data structures—e.g. dynamic hash structures or dynamic list swapping structures or the like.

Adaptive Hashing for Slist Management

FIG. 2A depicts an adaptive, dynamic hash system and technique (200) for managing Slists. As shown, hash module 202 is connected to one or more Slists 204 (e.g. Slist0 through Slist3). Each Slist may further comprises zero or more memory elements 206. Each of these memory elements 206 may be of either fixed size buffers or variable sized buffers and/or data structures.

In this embodiment, this hash of different Slists may be maintained by keying in a way that is associated with the system generally in a way that relates to the computing system topology and/or the multicore processor architecture. For example, FIG. 2A depicts two such topologies: (1) keying by the processor index (as shown by solid arrow lines for Group 0 labeled 208a); (2) or keying by NUMA node number (as shown by dashed arrow lines for Group 0 labeled 208b, further comprising nodes 210 and LPs 212). In these embodiments, the point of relating the index to the system topology may be to optimize the access time to minimize latency and contention with other processors in the system. As may be seen, memory elements may be adjusted and/or balanced between Slists (e.g., 214), according to suitable metrics for load-balancing and/or allocations of memory resources.

In one embodiment, it is possible to abstract a single logical Slist into multiple ones. In such a case, it may be possible to move the list entities between different lists so that allocations do not fail if one particular Slist is empty. All the Slists in the hash may be searched before allocation fails. It should be appreciated that different hash algorithms may also cater to system topology and optimization objectives such as NUMA or processor affinity extensions of these lists.

Figure 3:
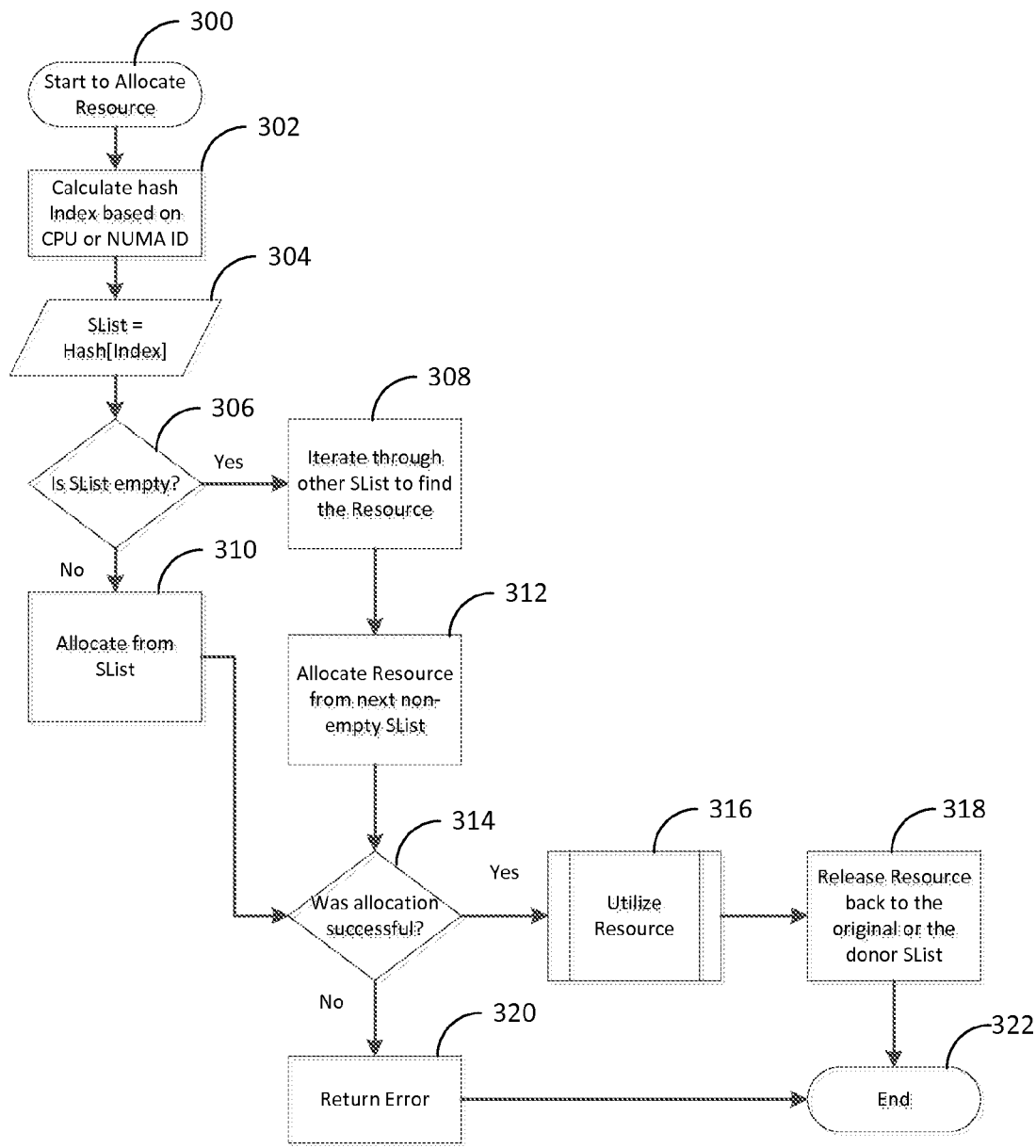
FIG. 3 depicts a flow diagram in one embodiment of an adaptive hash system, as might be implemented in FIG. 2A.

FIG. 3 depicts one possible flowchart for the processing of Slist within a hash structure. At step 300, the system starts to allocate memory resource and, at 302, the system may calculate a hash index based on a desired key (for example, CPU number or NUMA ID, as indicated in FIG. 2A). The Slist may then be assigned to the hash(index), as calculated.

The system may query, at 306, as to whether the Slist in particular is empty, or devoid of memory elements—and, if so, the system may iterate through the other Slists to find a suitable resource. Once found, the resource may be allocated from, say, the next non-empty Slist.

In the case where the Slist was not empty, the resource may be allocated therefrom at 310. Whether an allocation was made at step 310 or at step 312, the system may query whether the allocation was successful at 314. If not, the system may at that time return an error message at 320 and end processing at 322.

However, if the allocation was successful, the memory resource may be utilized as allocated at 316. Once the memory resource is no longer needed, the system may optionally release the resource back to the original or donor Slist and end the process at 322.

Dynamic List Swapping

FIG. 2B shows yet another embodiment of the use of dynamic list swapping data structures (250) for the effective management of Slists. As may be seen, two separate Slists—e.g. one for Push (release) 252a and one for Pop (acquire/allocate) 252b operations—may be maintained and each may have memory elements 254 to allocate. Two different pointers (256a and 256b) may be used to access these Slists. In the course of operation, if the Pop Slist is empty (or some other suitable metric to balance memory resources) during an attempted allocation, it is possible to swap the pointers so that the previous Push Slist now becomes the Pop Slist and vice-versa. From that point on, it is now possible to try to allocate from this new Pop Slist. This technique is analogous to maintaining different 'alloc' and 'free' lists and switching them when 'alloc' list is empty.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method of memory allocation for memory that is accessible within an operating system environment of a multicore processor, the method including controlling the allocation of the memory to memory-requesting portions of the multicore processor by:
  obtaining a plurality of partitioned lockless list structures, each of the partitioned lockless list structures including a respective plurality of list elements, each of the respective list elements corresponding to a respective portion of the memory that is currently eligible for allocation, the plurality of partitioned lockless list structures being partitioned by application of an adaptive hash to each of a plurality of key values that correspond to elements of a topology of an architecture of the multicore processor;
  upon a request for allocating one or more of the respective portions of the memory to a core processor for use as allocated memory, searching said plurality of partitioned lockless list structures for an available list element that corresponds to an available respective portion of the memory that is currently eligible for allocation for use as allocated memory, the searching performed using an adaptive hash that is keyed to respectively hash to each of the plurality of partitioned lockless list structures;
  upon finding said available list element, allocating said available respective portion of the memory to said core processor for use as allocated memory; and
  dynamically balancing said available list elements among said plurality of said lockless list structures according to a balancing metric that is configured to optimize the allocation of the memory.

2. The method of claim 1, wherein said respective portions of the memory comprise one or more of:
fixed size buffers, or
variable size buffers.

3. The method of claim 2, wherein said partitioned lockless list structures comprise Slist structures.

4. The method of claim 1, wherein obtaining said plurality of partitioned lockless list structures includes:
obtaining an initial lockless list structure that includes an initial plurality of list elements, each of the initial list elements corresponding to an initial respective portion of the memory that is currently eligible for allocation; and
partitioning the initial lockless list structure into the partitioned lockless list structures by applying the adaptive hash to the each of the plurality of key values that correspond to elements of the topology of the architecture of the multicore processor.

5. The method of claim 1, wherein said adaptive hash is keyed according to the multicore processor architecture.

6. The method of claim 1, wherein said adaptive hash is keyed according to processor index.

7. The method of claim 1, wherein said adaptive hash is keyed according to Non Uniform Memory Access (NUMA) node number.

8. The method of claim 1, wherein said balancing metric is configured to balance memory resources.

9. The method of claim 1, wherein said balancing metric is configured to maintain substantially numerical equality of memory elements among the lockless list structures.

10. The method of claim 1, wherein said balancing metric is configured to avoid over-allocation of memory resources.

11. The method of claim 1, wherein said adaptive hash is configured to accommodate a plurality of respective list headers that each reference corresponding respective ones of the partitioned lockless list structures.

12. A system for controlling memory allocation for memory that is accessible within an operating system environment of a multicore processor by controlling the allocation of the memory to memory-requesting portions of the multicore processor, the system comprising:
a first processor that initially partitions an initial lockless list structure into a plurality of partitioned lockless list structures, using an adaptive hash that is keyed according to an architecture of the multicore processor;
a second processor that initially partitions a plurality of list elements among said plurality of partitioned lockless list structures, each of the respective list elements corresponding to a respective portion of the memory that is currently eligible for allocation;
a third processor that, upon a request for allocating memory to a memory-requesting core processor, searches said plurality of partitioned lockless list structures for an available one of the respective list elements, and
upon finding said available one of the respective list elements, allocates, to the memory-requesting core processor, said respective portion of the memory that is currently eligible for allocation that corresponds to the found said available one of the respective list elements; and
a fourth processor that dynamically balances said list elements among said plurality of said partitioned lockless list structures according to a balancing metric, said balancing metric applied to distribute the list elements among said partitioned lockless list structures.

13. The system of claim 12, wherein:
said respective portions of the memory comprise one or more of:
fixed size buffers or variable sized buffers; and
wherein said initial lockless list structure comprises an Slist structure.

14. The system of claim 12, wherein partitioning said initial lockless list structure includes:
partitioning said initial lockless list structure into the plurality of partitioned lockless list structures, using the adaptive hash that is keyed according to processor index.

15. The system of claim 12, wherein partitioning said initial lockless list structure includes:
partitioning said initial lockless list structure into the plurality of partitioned lockless list structures, using the adaptive hash that is keyed according to NUMA node number.

16. A method comprising:
controlling allocation of memory to memory-requesting portions of a multicore processor by:
obtaining a plurality of partitioned lockless list structures, each of the partitioned lockless list structures including a respective plurality of list elements, each of the respective list elements corresponding to a respective portion of the memory that is currently eligible for allocation, the plurality of partitioned lockless list structures being partitioned using an adaptive hash that is keyed according to an architecture of the multicore processor;
upon a request for allocating one or more of the respective portions of the memory to a core processor for use as allocated memory, searching said plurality of partitioned lockless list structures for an available list element that corresponds to an available respective portion of the memory that is currently eligible for allocation for use as allocated memory, the searching performed using the adaptive hash;
upon finding said available list element, allocating said available respective portion of the memory to said core processor for use as allocated memory; and
dynamically balancing said available list elements among said plurality of said lockless list structures according to a balancing metric that is configured to optimize the allocation of the memory.

17. The method of claim 16, wherein said adaptive hash is keyed according to processor index.

18. The method of claim 16, wherein said adaptive hash is keyed according to Non Uniform Memory Access (NUMA) node number.

19. The method of claim 16, wherein said balancing metric is configured to avoid over-allocation of memory resources.

20. The method of claim 16, wherein said adaptive hash is configured to accommodate a plurality of respective list headers that each reference corresponding respective ones of the partitioned lockless list structures.

* * * * *